June 12, 1928.  
P. N. JOSLIN  
1,673,364  
ROLLER  
Filed March 21, 1927

Inventor  
Pliny N. Joslin  
By Fisher, Towle, Clapp, Soane,  
Attys.

Patented June 12, 1928.

1,673,364

UNITED STATES PATENT OFFICE.

PLINY N. JOSLIN, OF DE KALB, ILLINOIS.

ROLLER.

Application filed March 21, 1927. Serial No. 177,017.

This invention relates to rollers or wheels and more particularly to such as are provided with rubber or similar composition tires, usually of cushion type, and has for its primary object to provide a roller of the ball bearing type which, while especially adapted for use in connection with skates, is suitable for general purposes.

The invention is an improvement upon the roller construction shown and described in my prior Patent No. 1,627,561, dated May 10, 1927, and consists more especially in means for giving support to the tread or outer edges of the tire to add strength thereto and eliminate breakage thereof, these being serious objections to devices as heretofore constructed.

A further object of the invention is to provide a novel and improved construction to stiffen the metal disks or side plates upon each side of the wheel or roller, and to provide novel fastening means or rivets for holding the structure assembled which are so located with respect to the annular side plates near the center thereof as to avoid drawing the plates together at such point as to cause an excessive strain or compression of the tire and thereby eliminate breakage and other existing difficulties and objectionable features of such devices as heretofore constructed.

The many other objects and advantages of my improved roller will be better understood by reference to the following specification when considered in connection with the accompanying drawing illustrating certain selected embodiments thereof, in which:—

Figure 1:
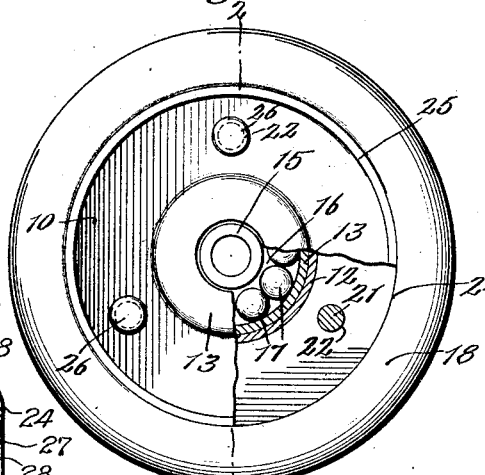
Fig. 1 is a side elevation, partially broken away and in section, of my novel roller.

Referring to the drawings in detail, the roller comprises a pair of substantially flat metal disks or side plates 10 of annular formation and each provided with a central opening 11 and an inwardly directed annular flange 12 surrounding this opening and forming annular shoulders on the inner faces of the plates 10. These flanges 12 form the hub of the roller when the parts are assembled.

A ball cup forming an annular member or ring structure 13 fits within the opening 11 in each of the side plates and is preferably provided with an outwardly extending peripheral flange or lip 14 at the open inner side of each cup which abuts the edge of the flange 12 on that plate. A hollow or tubular shaft 15 extends through the ball cups, being hollow to admit the usual axle of the roller (not shown). The central portion 16 of this shaft is raised to form a bearing for the two rows of balls 17, one row being disposed on each side thereof in the cups 13 so as to bear in the concavities or races formed by the raised portion of the shaft.

Figure 2:
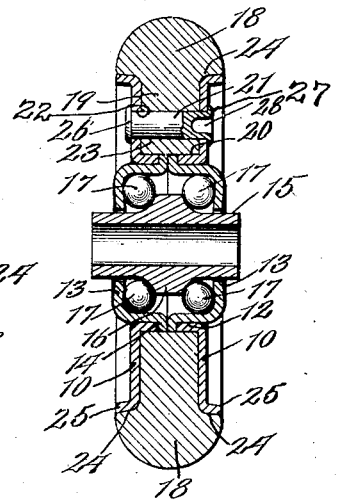
Fig. 2 is a transverse diametrical section taken on the line 2—2 of Figure 1.
Figure 7:
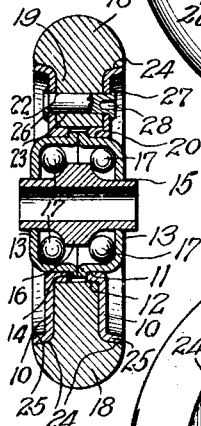
Fig. 7 is a sectional view, similar to Figure 2, of a slightly modified form.
Figure 3:
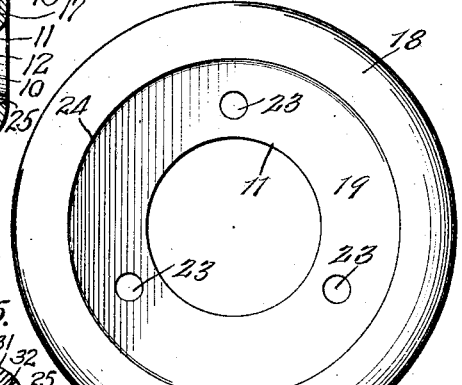
Fig. 3 is a side elevation of the tire.
Figure 4:
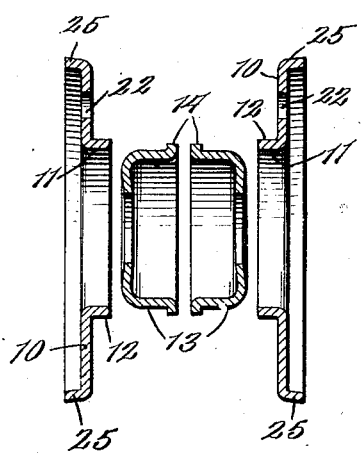
Fig. 4 is a detail sectional view of parts of the roller disassembled.

The tire 18 is preferably of the cushion type and may be formed of rubber, rubberized fabric, fiber, or other suitable material of a plastic character, such as bakelite combined or impregnated with fabric or other textile or fibrous material which may be tough and of high compressive and tensile strength, in addition to being light in weight, water-proof, and unaffected by the elements. This may be a non-warping composition of bakelite with a fiber or textile base such as condensite-celeron, a product of phenol and formaldehyde, which may be described as a vulcanized fiber thoroughly impregnated with condensite and hardened by heating. The tire is provided with a rib or annular part 19 which lies between the side plates 10 and is slightly gripped or frictionally held thereby when the roller is asembled but not with sufficient force to cause undue strain or breakage as is the case with some rubber compositions or cushion tires. This rib preferably snugly fits about or on the inturned flanges or shoulders 12 on the inner faces of the plates 10 as at 20, so that the tire is at all times supported thereby in conjunction with the flanges 14 which fit between the flanges 12 as shown in Figure 2 or independently of said flanges 14 as shown in Figure 7. However, the flanges 14 may be slightly spaced from the inner wall of the tire rib 19 as shown in Figure 7. This is an important feature as the radial strain produced by the rolling action of the tire in turning corners is thereby practically entirely eliminated or taken up by these flanges 12 and 14.

In practice, it has heretofore been found that one of the most serious objections to rubber tires on rollers of this type and particularly those of roller skates, was the tendency of these tires to work loose on the roller and in the construction of my prior application above referred to, considerable breakage was due to the sharp peripheral edges of the plates cutting into the sides of the tread and the fastening means or rivets connecting the plates through the rib of the tire being drawn so tight as to not only materially increase this cutting action but cause breakage of the tire due to excessive strain in the upsetting of the ends of the rivets or the heading thereof against the outer faces of the plates. The result was that the roller was soon rendered unserviceable. The present improved construction has entirely eliminated these objectionable features as will now be further described.

The parts of the roller are held together or in assembled relation by a series of rivets, bolts, or other suitable form of fastenings, but preferably rivets in the form shown at 21. The fastenings or rivets project through corresponding holes 22 in the oppositely disposed side plates 10 and through similar holes 23 in the rib 19 of the tire. These fasteners in passing through the plates and rib by reason of the holes or perforations provided therein in their manufacture previous to their assembly, cause snug engagement of the parts and of the rib of the tire between the side plates so as to act with the side plates to prevent creeping of the tire. Instead of positioning these fastenings near the peripheral edges of the plates as in my prior construction and other devices as heretofore produced, the holes 22 and 23 are positioned approximately centrally or midway between the annular portions of the plates or rib and preferably slightly inwardly of their concentric centers, as clearly shown in the drawings. With the sharp outer edges of the plates of unflanged formation as heretofore constructed and the heading of the rivets to clamp the parts together, too much strain was exerted in drawing the plates against the tire at the rib and juncture thereof with the tread of the tire so that the rivets brought unusual or excessive strain on the compressed tire which caused heavy loss and real trouble by breakage aggravated by the cutting action of the peripheral edges of the plates cutting into the tire. To avoid this, fillets 24 are formed at each side in the rubber of the tire at the juncture of the rib and tread and the side plates 10 have their outer edges turned outward to form peripheral flanges 25 which engage the fillets or internal shoulders of the tire at the tread and give further support to the outer edge of the tire. By thus permitting the use of a fillet in the rubber or other material composing the tire, I add greatly to the strength and in this way eliminate trouble caused by cutting and breaking. In addition, the rivets by being substantially centrally positioned and preferably slightly inwardly, the strain on the plates and tire and more particularly the rib portion thereof and at the juncture of the rib with the tread portion, is more evenly distributed. The turned outer edges of the flanges or plates serve to support the edge of the tire, that is, the ribs or fillets at the sides of the tread and, consequently, the tread as a whole, in addition to stiffening the plates or washers. Moreover, the flat inner faces of the plates firmly grip the tire without tending to crowd the same outwardly. The metal parts of the roller with the exception of the balls, fasteners, and central shaft are preferably stamped from sheet metal.

Instead of employing fasteners in the form of rivets headed on both ends as enlargements in the manner disclosed in my prior construction, which results in the side plates being unduly forced together and clamping the rib with the tire too tightly or under excessive compression, I employ the rivets shown more particularly in Figure 2, in which one end of each is headed prior to use, as indicated at 26 and the opposite end is flanged or headed as indicated at 27. This is accomplished by means of a central punching and eyelet forming device which forms a recess 28 and turns over the end of the rivet or pin. Preferably the rivet or pin has a hollow end which is simply flanged or turned over in the manner shown. The advantage of this construction is that the pin takes most of the force of the blow or pressure in the forming or turning operation by reason of the tool engaging in the depression 28 or having less metal to turn or upset owing to the hollow tubular formation thereof. This causes the parts to be held together without pressure sufficient to cause the tire to be unduly compressed or strained and at the same time furnishes a substantial and durable connection. While three of the rivets are shown, this having been found sufficient in practice, it is obvious that any desirable number may be used. The construction lends to desirable lightness which is one of the essentials in connection with rollers of this type and especially as used on roller skates, but it may equally apply to other devices equipped with the rollers.

Figure 5:
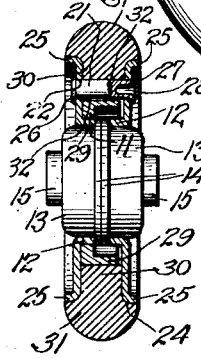
Fig. 5 is a transverse section of a modified form of roller.
Figure 6:
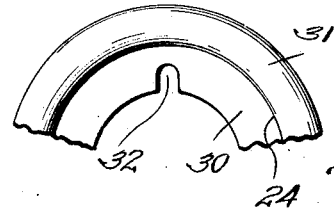
Fig. 6 is a partial side elevation of the tire in the roller shown in Fig. 5.

Obviously, the tread may be of modified construction, that is, formed in one or two parts with an annular part or ring as shown in Figures 5 and 6 in order to produce the annular member or ring structure with or without the cups 13 interposed between the inturned flanges of the plates and the inner face of the tire rib. In this form a ring or annular part as 29, forming an annular member or ring structure with or without the cups 13, is interposed between the inturned flanges 12 on the side plates 10 and the inner face of the rib 30 on the tire 31. This rib or the ring preferably fits snugly upon one or both of the flanges and when a ring is employed the tire fits in a similar manner upon the ring, thus supporting the tire in the same manner as previously described but with notches 32 instead of holes to provide perforations in the rib to admit the fasteners.

It will be obvious from the foregoing description that my improved roller is simple, durable, and economical in construction and advantageous in use.

I am also aware that the form and arrangement of parts of my roller may be considerably varied without departing from the spirit of my invention, and I reserve the right to make all such changes as fairly fall within the scope of the following claims.

I claim as my invention:

1. As an article of manufacture, a wheel or roller comprising a pair of oppositely arranged flat side plates having outturned outer edges, an annular member disposed between said plates and concentric therewith, and a cushion tire having a rib projecting between said plates and seated upon said member, and also having fillets at the sides receiving and engaging the outturned outer edges of the plates to give additional support to the tire.

2. As an article of manufacture, a wheel or roller comprising a pair of oppositely arranged flat side plates having angular inner and outer edges, an annular member disposed between the inner edges, and a cushion tire having a reduced portion projecting between the plates and connected thereto, the tread of the tire resting upon the angular outer edges of the plates.

3. As an article of manufacture, a wheel or roller comprising a pair of oppositely arranged side plates, a ring structure disposed between said plates, a cushion tire projecting inwardly and snugly fitting between said plates and on the ring structure, the sides of the tire having fillets forming projections at the sides of the tread portion of the tire and the peripheral edges of the plates having flanges seating in the fillets, and means extending through said side plates and tire for securing the side plates together and the tire in position.

4. As an article of manufacture, a wheel or roller comprising a pair of oppositely arranged side plates, a ring structure disposed between said plates, a cushion tire projecting inwardly and snugly fitting between said plates and on the ring structure, the sides of the tire having fillets forming projections at the sides of the tread portion of the tire and the peripheral edges of the plates having flanges seating in the fillets, and means for holding the side plates and tire in assembled position.

5. As an article of manufacture, a wheel or roller comprising a pair of oppositely arranged side plates, a ring structure disposed between said plates, a cushion tire projecting inwardly and snugly fitting between said plates and on the ring structure, the sides of the tire having fillets forming projections at the sides of the tread portion of the tire and the peripheral edges of the plates having flanges seating in the fillets, the side plates and the inwardly projecting portion of the tire disposed between the plates having registering holes located substantially equi-distantly between the inner and outer edges of the plates, and fastenings extending through said holes 6. As an article of manufacture, a wheel or roller comprising a pair of oppositely arranged side plates, a ring structure disposed between said plates and including a bearing, a cushion tire projecting inwardly and snugly fitting between said plates and on the ring structure, the sides of the tire having fillets forming projections at the sides of the tread portion of the tire and the peripheral edges of the plates having flanges seating in the fillets, the side plates and the inwardly projecting portion of the tire disposed between the plates having registering holes located substantially equi-distantly between the inner and outer edges of the plates, and rivets extending through said holes to clamp said parts together without undue strain or pressure, one end of each rivet having a head and the other end having a cavity and its wall upset against the adjacent plate to prevent undue clamping of the plates against the tire.

7. As an article of manufacture, a wheel or roller comprising a pair of oppositely arranged side plates, an annular shoulder formed on the inner faces of said plates, a cushion tire extending snugly between said plates and fitting on the shoulder, and means extending through said side plates and tire for securing said side plates and tire together, said means being positioned substantially centrally between the inner and outer edges of the plates but slightly inwardly thereof.

8. As an article of manufacture, a wheel or roller comprising a pair of substantially oppositely arranged side plates having annular inner and outer portions, the outer portions being directed outwardly, a ring structure disposed between said plates and including a bearing, a cushion tire having a rib extending between said plates and a tread portion forming internal shoulders resting on the annular outer portions of the plates, and transverse connecting means extending through the plates and the rib.

9. As an article of manufacture, a wheel or roller, comprising a pair of oppositely arranged disks, each provided with a lateral inwardly directed annular flange at its inner edge concentric with the disk and a laterally directed annular flange at its outer edge, a tire provided with a rib projecting between said disks and snugly fitting about said flanges at the inner edges and having outwardly projecting side portions at the tread snugly fitting the annular flanges at the outer edges of the disks, and fastening means extending through said disks intermediately of the edges thereof and extending through said disks and rib, said means constituting the sole means of connection between the disks and rib.

10. As an article of manufacture, a roller comprising a pair of oppositely disposed disks, each provided with a central opening, an inwardly directed annular flange about said opening, and an annular flange at its peripheral edge, a tire extending between said disks and having portions seated upon the flanges, ball cups fitting within the openings within the disks, a shaft extending through said cups, bearing balls interposed between the cups and shaft, and fastening means between the disks and tire and positioned substantially centrally between the inner and outer edges of the disks.

11. As an article of manufacture, a wheel or roller comprising a pair of oppositely arranged side plates having shoulders at their inner and outer edges, a tire extending between said plates and having annular parts at the inside and at the peripheral portion thereof fitting on said shoulders.

12. As an article of manufacture, a wheel or roller comprising a pair of oppositely arranged side plates having flanges at their outer edges, an annular shoulder formed on the inner face of one of said plates, a tire extending between said plates, an annular part fitting on said shoulder, the tread of the tire having portions engaging the flanges, and fastening means extending through the plates and snugly holding and clamping the annular part therebetween without undue pressure.

13. As an article of manufacture, a wheel comprising a pair of oppositely arranged disks, each of said disks having an inner or an outer shoulder, a tire engaging said shoulders and having a rib projecting between the disks, and fastening means extending through the disks and rib, said fastening means being disposed in spaced relation and slightly inwardly of the concentric centers of the disks.

14. As an article of manufacture, a wheel or roller comprising a pair of oppositely arranged flat side plates having outturned outer edges, an annular member disposed between said plates and concentric therewith, and a cushion tire having a rib projecting between said plates, and also having fillets at the sides receiving and engaging the outturned outer edges of the plates to give additional support to the tire.

PLINY N. JOSLIN.